(No Model.)
C. BIRKERY.
VALVE.
No. 530,633. Patented Dec. 11, 1894.
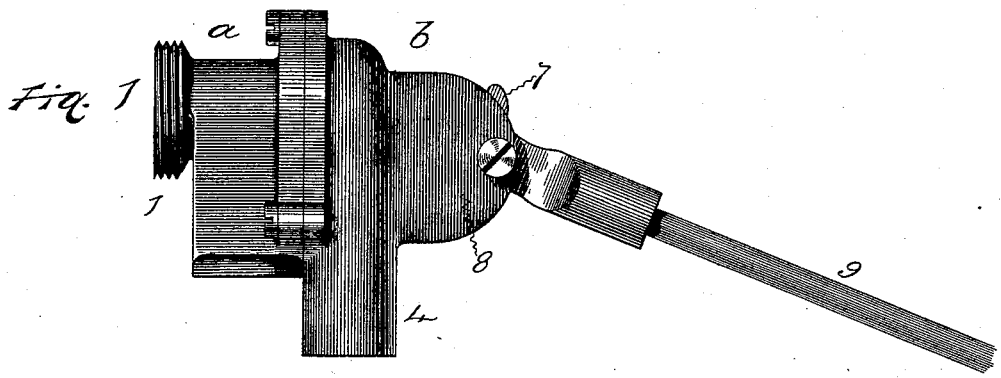
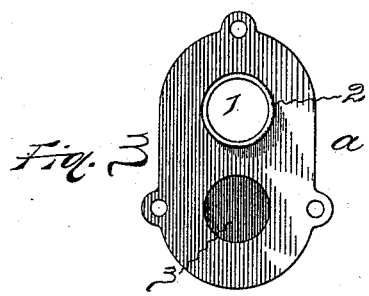
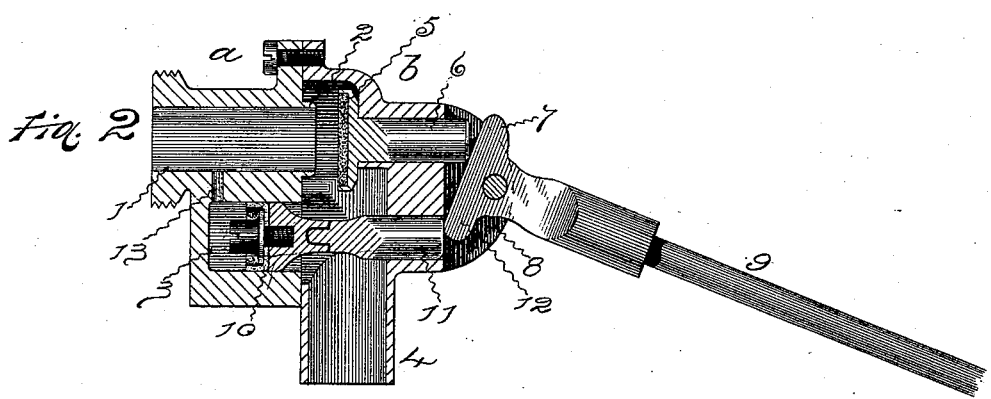
Witnesses:
C. E. Buckland,
P. A. Phelps
Inventor:
Cornelius Birkery,
by Harry R. Williams
Atty.

UNITED STATES PATENT OFFICE.

CORNELIUS BIRKERY, OF HARTFORD, CONNECTICUT, ASSIGNOR TO THE BIRKERY MANUFACTURING COMPANY, OF SAME PLACE.

VALVE.

SPECIFICATION forming part of Letters Patent No. 530,633, dated December 11, 1894.

Application filed November 8, 1893. Serial No. 490,394. (No model.)

*To all whom it may concern:*

Be it known that I, CORNELIUS BIRKERY, a citizen of the United States, residing at Hartford, in the county of Hartford and State of Connecticut, have invented certain new and useful Improvements in Valves, of which the following is a specification.

The invention relates to the class of tank valves or ball cocks that shut against the pressure of water, which are provided with a balance to render the shutting easy and sure; and the object is to construct a simple and cheap valve of this class having a large waterway, which can be shut by a disk moving against high pressures, without singing, hammering, or making other objectionable noises.

Referring to the accompanying drawings:—Figure 1 is a side view of the valve. Fig. 2 is a vertical section; and Fig. 3 is a face view of the part of the shell that has the seat and the balancing-piston-cylinder.

The shell of the valve shown in the views is usually cast to shape in two parts, $a$ and $b$, that are held together by bolts or screws. The part, $a$, has an inlet, 1, adapted to be attached to a supply pipe, with a seat, 2, formed around the end of the inlet passage, and a cylindrical chamber, 3, that opens with a small passage, 13, into the waterway on the pressure side of the seat, and with a larger passage into the waterway on the escape side of the seat. In the chamber in the part $b$, that has the outlet bib, 4, is a suitably packed disk, 5, having a stem, 6, that extends from the interior to the exterior of the shell through a perforation, the walls of which loosely support the stem so that the disk is free to move toward and from the seat to close or open the valve. On the exterior of the shell this stem of the valve-disk engages with an arm, 7, of the float-lever that is pivoted to the shell between ears, 8, on the part $b$; a float-rod, 9, to which may be attached an ordinary float, being connected with this lever in any common manner.

In the cylindrical chamber in the part $a$, is a suitably packed piston, 10, that has a stem, 11, which extends through a perforation in the walls of the part $b$. This stem also engages an arm, 12, of the float-lever, but on the opposite side of the pivot of the lever from the point of engagement of the stem of the seat-disk.

When water is let out of the tank and the float drops, the float-lever rocking on its pivot frees the stem so that the seat-disk, under the pressure at the inlet, is moved away from the seat, and water allowed a passage through the valve. This rocking of the float-lever pushes in the stem of the piston; but when the float begins to lift again as the level of the water rises, and the float-lever is pushing against the stem to close the disk against the seat, the increasing pressure at the inlet as the water is choked off is exerted on the piston in its cylinder, and this causes the stem of the piston to push against its arms of the rocking float-lever in such manner as to aid in closing the disk under the increasing pressure. The pressure of the water at the inlet, exerted on the piston, also helps to keep the disk shut against the seat and prevent the escape of any water should the pressure for a short period suddenly become increased, as the increased pressure is also exerted against the piston as well as the seat-disk.

By means of this construction a simple and cheap valve is produced that has but few parts, and these parts are easily made and quickly assembled. This valve can be provided with a large waterway, and made to close easily with a small float against a very high pressure, as the balancing piston can be made of any desired size, according to the pressure of the system in which the valve is to be placed.

I claim as my invention—

A valve consisting of a shell formed in two separable parts, one of said parts having an inlet chamber with a seat at its end and a piston chamber parallel with the inlet chamber with a small passage between the inlet chamber and the piston chamber, and the other part having a disk chamber and outlet bib extending at right angles to the inlet chamber and bearing a three-armed float lever, a spindle bearing a disk movable in the disk chamber toward and from the seat in line with the inlet chamber and at right angles to the outlet bib, the end of the spindle being adapted to push outward against one arm of the float lever, a piston in a piston chamber facing in the same direction as the disk and movable parallel with the inlet chamber a spindle loosely attached to the piston and adapted to push against an arm of the float lever on the opposite side of its pivot, and a float rod connected with the third arm of the lever, substantially as specified.

CORNELIUS BIRKERY.

Witnesses:
H. R. WILLIAMS,
C. E. BUCKLAND.